United States Patent
Zhou et al.

(10) Patent No.: US 10,436,933 B2
(45) Date of Patent: Oct. 8, 2019

(54) DIGITAL SPECTROMETER FOR MEASURING IRONIZING RADIATION DOWNHOLE

(71) Applicant: BAKER HUGHES INCORPORATED, Houston, TX (US)

(72) Inventors: Quming Zhou, Houston, TX (US); Toyli Anniyev, The Woodlands, TX (US); Feyzi Inanc, Spring, TX (US); Steven Bliven, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/148,651

(22) Filed: May 6, 2016

(65) Prior Publication Data

US 2017/0322340 A1    Nov. 9, 2017

(51) Int. Cl.
*G01V 5/04*     (2006.01)
*G01V 5/06*     (2006.01)
(Continued)

(52) U.S. Cl.
CPC ............... *G01V 5/045* (2013.01); *G01V 5/06* (2013.01); *G01V 5/101* (2013.01); *G01V 5/102* (2013.01); *G01V 5/12* (2013.01)

(58) Field of Classification Search
CPC ........ G01V 5/10; G01V 5/102; G01V 11/102; G01V 5/125; G01V 5/045; G01V 5/06
See application file for complete search history.

(56) References Cited

U.S. PATENT DOCUMENTS 4,390,783 A    6/1983   Grau
4,545,020 A *  10/1985  Brasfield ............... G01F 23/266
                                              340/618
(Continued)

FOREIGN PATENT DOCUMENTS

WO    2012/158759 A2    11/2012
WO    2015/081134 A2    6/2015

OTHER PUBLICATIONS

Barnaba, O. et al., "A 12-Bit ADC With Independent Gates for Fast Neutron Spectrometry," Nuclear Instruments and Methods in Physics Research A 484, pp. 233-241 (2002).
(Continued)

*Primary Examiner* — Kiho Kim
(74) *Attorney, Agent, or Firm* — Mossman, Kumar & Tyler, PC

(57) ABSTRACT

Systems, methods, and devices for evaluating an earth formation intersected by a borehole. Apparatus may include at least one radiation detector configured to generate an analog electrical signal responsive to a plurality of radiation events, comprising absorption of incident ionizing radiation at a corresponding energy level, and an ionizing radiation spectrometer configured to convert each analog electrical signal from the at least one radiation detector into a plurality of digital signal pulses corresponding to the radiation events and resolve the plurality of digital signal pulses into radiation count information representative of the radiation events. Spectrometers include an input channel for each detector of the at least one radiation detector comprising an analog-to-digital converter (ADC) and configured to convert the analog electrical signal for each detector into the plurality of digital signal pulses; and at least one processor configured to generate the radiation count information.

22 Claims, 7 Drawing Sheets

(51) Int. Cl.
*G01V 5/10* (2006.01)
*G01V 5/12* (2006.01)

(56) References Cited

U.S. PATENT DOCUMENTS

| | | | |
|---|---|---|---|
| 4,749,859 A * | 6/1988 | Schmidt | G01V 5/04 |
| | | | 250/256 |
| 4,760,252 A * | 7/1988 | Albats | G01V 5/04 |
| | | | 250/266 |
| 4,766,543 A | 8/1988 | Schmidt | |
| 5,132,540 A * | 7/1992 | Adolph | G01T 1/171 |
| | | | 250/262 |
| 5,684,850 A | 11/1997 | Warburton et al. | |
| 5,870,051 A | 2/1999 | Warburton et al. | |
| 7,683,334 B2 | 3/2010 | Farsoni et al. | |
| 7,807,973 B2 | 10/2010 | Mott | |
| 7,999,220 B2 | 8/2011 | Odom | |
| 8,164,050 B2 | 4/2012 | Ford et al. | |
| 8,436,296 B2 | 5/2013 | Ford et al. | |
| 8,624,195 B2 | 1/2014 | Nelson | |
| 8,735,803 B2 | 5/2014 | Ford et al. | |
| 8,927,920 B2 | 1/2015 | Grau | |
| 8,946,648 B2 | 2/2015 | Nelson | |
| 9,012,836 B2 | 4/2015 | Wilson et al. | |
| 9,057,789 B2 | 6/2015 | Seino et al. | |
| 9,065,432 B2 | 6/2015 | Ouvrier-Buffet et al. | |
| 2007/0290126 A1 * | 12/2007 | Kurkoski | G01T 1/171 |
| | | | 250/262 |
| 2008/0099689 A1 * | 5/2008 | Nygard | G01T 1/2018 |
| | | | 250/370.09 |
| 2009/0033516 A1 * | 2/2009 | Alteirac | E21B 47/12 |
| | | | 340/853.2 |
| 2010/0294944 A1 * | 11/2010 | Furumiya | G01T 1/1647 |
| | | | 250/370.1 |
| 2011/0112810 A1 | 5/2011 | Scoullar et al. | |
| 2011/0186721 A1 | 8/2011 | Galford | |
| 2013/0158875 A1 * | 6/2013 | Brown | E21B 47/10 |
| | | | 702/7 |
| 2013/0187052 A1 | 7/2013 | Nelson | |
| 2015/0323683 A1 | 11/2015 | Vasilyev et al. | |

OTHER PUBLICATIONS

Bousselham, A., "FPGA Based Data Acquisition and Digital Pulse Processing for PET and SPECT," Stockholm University, Dept. of Physics, 92 pp. (2007).

Cheng, X., et al., "A Multi Channel High Accuracy Real Time DAQ System for Fast Neutron Spectrometer Based on GEM-TPC," IEEE Nuclear Science Symposium and Medical Imaging Conference Record (NSS/MIC), 3 pp. (2012).

Becker, E.M., "The Minispec: A Los-Cost, Compact, FPGA-Based Gamma Spectrometer for Mobile Applications," Thesis for the degree of Master of Science in Radiation Health Physics, 99 pp. (2013).

Lanh, Dang, et al., "In-house Development of an FPGA-Based MCA8K for Gamma-Ray Spectrometer," SpringerPlus 3:665, 12 pp., http://www.springerplus.com/content/3/1/665 (2014).

PCT/US2017/030265—International Preliminary Report on Patentability dated Nov. 6, 2018.

* cited by examiner

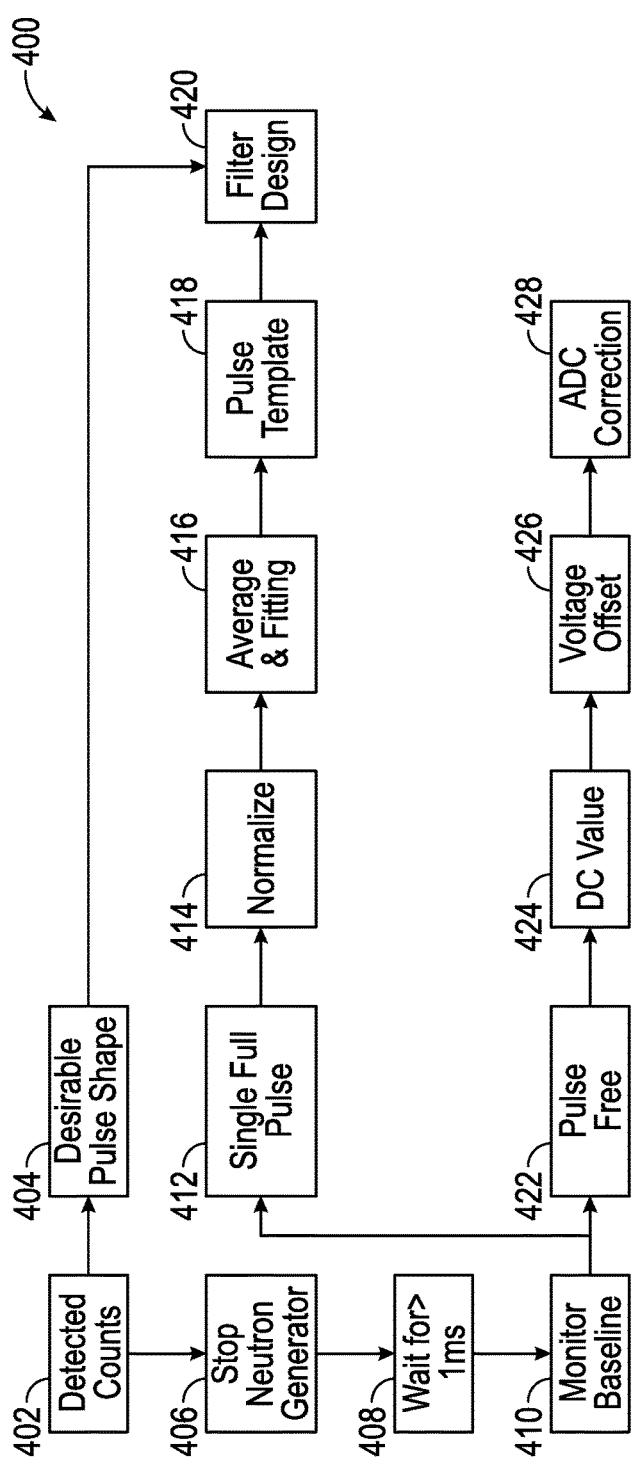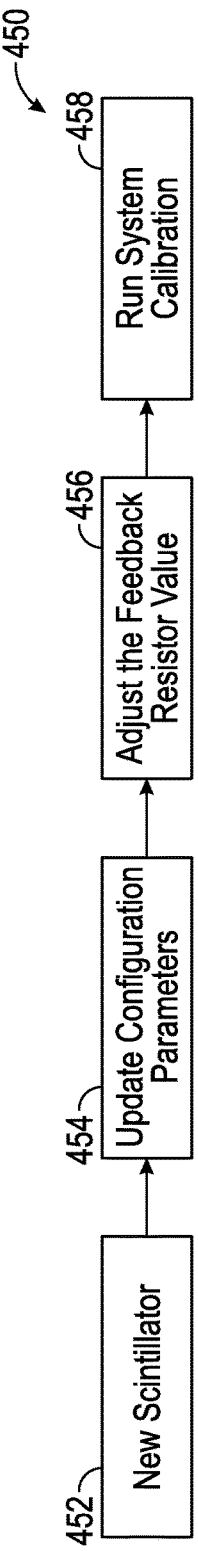
FIG. 4A
FIG. 4B

DIGITAL SPECTROMETER FOR MEASURING IRONIZING RADIATION DOWNHOLE

FIELD OF THE DISCLOSURE

In one aspect, this disclosure generally relates to borehole logging methods and apparatuses for estimating at least one parameter of interest relating to a volume of matter using nuclear radiation based measurements.

BACKGROUND OF THE DISCLOSURE

Using nuclear techniques to investigate volumes of either organic or inorganic matter is well known. For example, naturally radioactive elements are commonly found in earth formations in various proportions, depending on the type of lithology and other factors. Radioactive isotopes of potassium, uranium, and thorium are typical regularly occurring naturally radioactive elements commonly quantified in the petroleum industry.

A rigid or non-rigid conveyance device is often used to convey one or more nuclear radiation detectors into a borehole intersecting the earth formation, often as part of a tool or a set of tools. There, the detector(s) may be used to estimate radiation associated with a volume of interest of the earth formation by generating a response to the one or more types of nuclear radiation present in the near-borehole environment during measurement. This response may then be used to estimate a parameter of interest of the volume. In nuclear logging, additional radioactive isotopes may be generated by providing radiation (e.g., neutron bombardment) to the formation.

Oil well logging has been known for many years and provides an oil and gas well driller with information about the particular earth formation being drilled. One or more parameters of interest of the earth formation obtained as above may relate to hydrocarbon exploration or production. For example, the parameter of interest may provide indications of the location and extent of hydrocarbons in a given earth formation. A rigid or non-rigid carrier may also provide communication channels for sending information up to the surface.

SUMMARY OF THE DISCLOSURE

In aspects, the present disclosure is related to methods of estimating a parameter of interest of a formation using radiation detected from a subterranean formation. Further aspects of the disclosure include an apparatus for evaluating an earth formation intersected by a borehole. Apparatus embodiments may include at least one radiation detector configured to generate an analog electrical signal responsive to a plurality of radiation events. Each radiation event of the plurality of radiation events may comprise absorption of incident ionizing radiation at a corresponding energy level. Apparatus embodiments may further include an ionizing radiation spectrometer. The ionizing radiation spectrometer may be configured to convert each analog electrical signal from the at least one radiation detector into a plurality of digital signal pulses corresponding to the radiation events and resolve the plurality of digital signal pulses into radiation count information representative of the radiation events.

The at least one radiation detector may comprise a plurality of radiation detectors. The analog electrical signal of each radiation detector may comprise a current signal. The radiation count information may include a gamma ray response spectrum. The ionizing radiation spectrometer may include an input channel for each detector of the at least one radiation detector comprising an analog-to-digital converter (ADC) and configured to convert the analog electrical signal for each detector into the plurality of digital signal pulses; and at least one processor configured to: determine at least one signal characteristic of at least one pulse of the plurality of digital signal pulses; and use the at least one signal characteristic to create an association of the at least one pulse with an event in a particular energy window of a plurality of energy windows, each energy window of the plurality of energy windows associated with a corresponding range of energy values; and use the association to generate the radiation count information. The analog electrical signal may be a current signal, and the analog input signal may be a voltage signal.

The at least one processor may include a corresponding digital processing unit for the input channel for each detector. The corresponding digital processing unit may be configured for digital pulse shaping, pulse detection, and spectra building. The corresponding digital processing unit may include a parallel digital filter array to sort the plurality of signal pulses into at least one of a plurality of pulse subsets according to at least one signal characteristic. The corresponding digital processing unit may include a pulse detection module for each filter of the parallel digital filter array. The corresponding digital processing unit may be configured to resolve pulse pile-up by combining results from the pulse detection module for each filter.

The pulse detection module for each filter may conduct pulse detection using a plurality of thresholds estimated from baseline noise. The pulse detection module for each filter may conduct pulse detection using a search window estimated from delivered pulse counts.

The ionizing radiation spectrometer may include an input channel for each detector of the at least one radiation detector, the input channel comprising a receiver circuit for each input channel including an adjustable feedback resistor configured to integrate a charge of the current signal to produce an analog voltage input signal. The at least one processor is configured to compensate for voltage offset by subtracting a dynamically monitored baseline value from measurements of the digital signal pulses.

The at least one processor may be configured to conduct pulse shaping of a first portion of the digital signal pulses using a digital filter employing first values of filter coefficients stored in a computer memory accessible to the at least one processor; update the filter coefficients in dependence upon the digital pulses by storing second values of the filter coefficients in the computer memory; and conduct pulse shaping of a second portion of the digital signal pulses using the digital filter employing the second values of the filter coefficients stored in the computer memory. The digital filter may comprise at least one of: i) a finite impulse response (FIR) filter; and ii) an infinite impulse response (IIR) filter. The apparatus may include a pulsed neutron generator. The at least one processor may be configured to stabilize peaks in a response spectrum derived from the radiation count information by adjusting power to at least one of: i) the pulsed neutron generator; and ii) the radiation detector. The at least one processor may comprise a corresponding digital processing unit for the input channel for each detector, and the at least one processor may be configured to synchronize the pulsed neutron generator with the corresponding digital processing unit for the input channel for each detector.

The at least one processor may be a single integrated circuit. The digital spectrometer may be configured to accept analog electrical signals from a plurality of ionizing radiation detectors each having different components, such as, for example, different scintillators, and adjust signal processing to compensate for differences in signal characteristics specific to each detector of the plurality of ionizing radiation detectors. The radiation count information may include at least one of: i) energy-dependent radiation count information, and ii) time-dependent radiation count information. The apparatus may include at least one computer memory accessible to the at least one processor for storing configuration parameters used by the at least one processor to configure the spectrometer for use with particular radiation detectors. The at least one radiation detector may include at least one scintillator configured to produce light scintillations responsive to the radiation events and optically coupled to at least one photomultiplier tube configured to produce a current signal responsive to the light scintillations. The receiver circuit may be configured to produce the voltage signal responsive to the current signal.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 4A is a data flow diagram illustrating methods for calibration in accordance with embodiments of the present disclosure.

FIG. 4B is a data flow diagram illustrating methods for normalization in accordance with embodiments of the present disclosure.

DETAILED DESCRIPTION

Figure 1A:
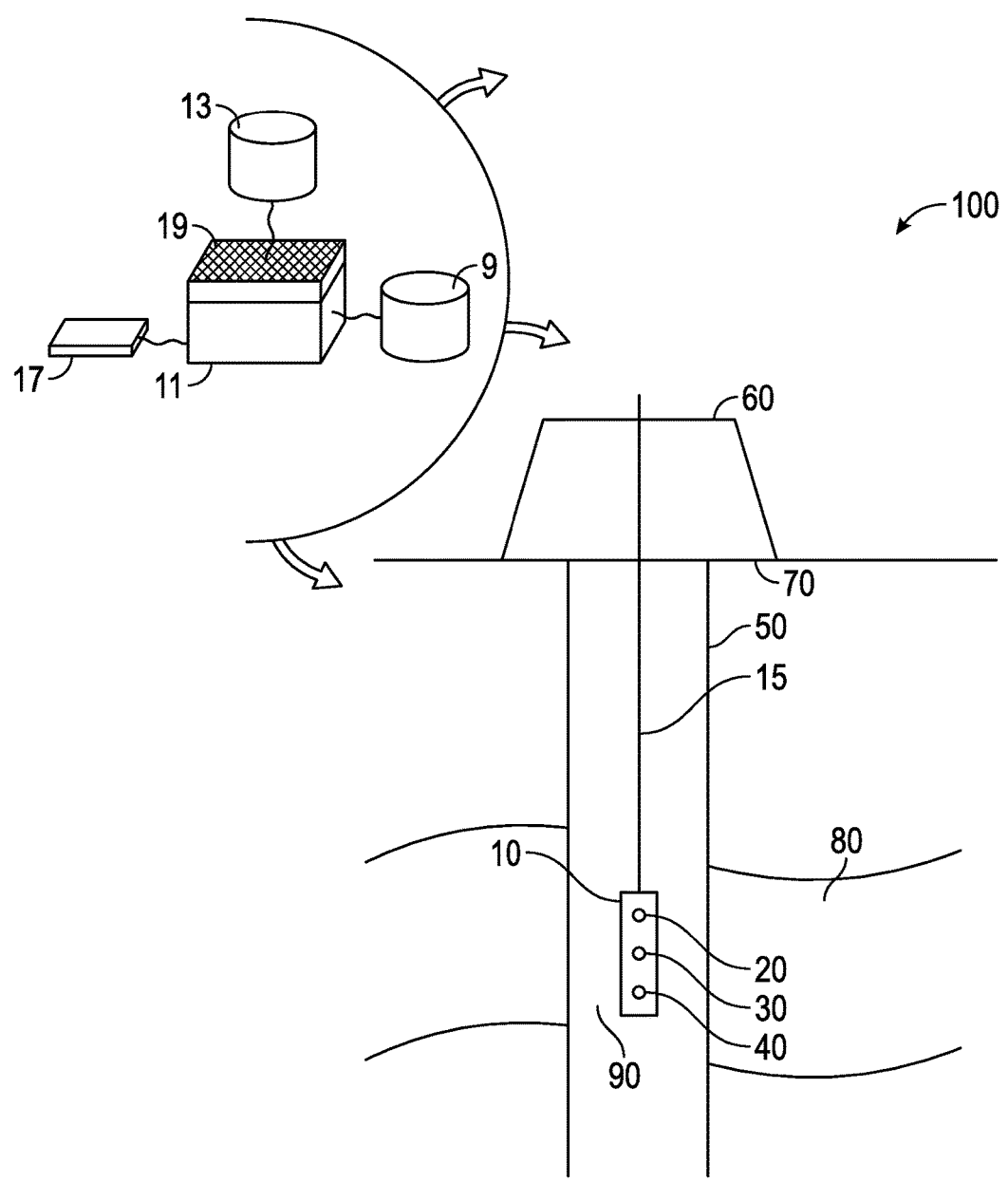
FIG. 1A schematically illustrates a system having a downhole tool configured to acquire information in a borehole intersecting a volume of interest of an earth formation.

In aspects, this disclosure relates to using a downhole tool to detect radiation from a subterranean formation. In other aspects, this disclosure relates to estimating a parameter of interest of a subterranean formation from detected radiation. Illustrative methods for estimating a parameter of interest may include the acquisition and utilization of information characterizing pulses detected at a single detector or a group of detectors. In many instances, the information used for these estimations may be acquired by tools conveyed in a wellbore intersecting one or more formations of interest. For context, an exemplary system for deploying and using such tools to acquire this information is described below. Each of these aspects may be referred to generally as investigation of the formation.

In some embodiments, the detectors may detect radiation from naturally occurring radionuclides. In other embodiments, the formation may be exposed to energy from a radiation source. Downhole tools may include this radiation source and one or more detectors. Herein, the radiation source may include, but is not limited to, one or more of a neutron source, a gamma-ray source, or an X-ray source. The detectors may be used to detect radiation from the formation, though the detectors are not limited to detecting radiation of the same type as emitted by the radiation source. Detectors may include at least one radiation responsive component, such as a scintillation media (e.g., a scintillation crystal, such as bismuth germanium oxide ('BGO')) or a semiconductor material (e.g., gallium nitride); and at least one output device generating information in response to detections in the radiation responsive component. The output device may be implemented with a light detection device, such as, for example, a photomultiplier tube ('PMT').

In one example, the light yield of a crystal is proportional to deposited radiation energy (the 'radiation event'). The PMT converts the light output of the crystal into an electrical charge (e.g., current) pulse following each scintillation event. Since by definition current is a flow of charge, herein the signal from the burst charge is defined as a current signal. In some implementations, a receiver circuit may be placed after the PMT to integrate the burst electric charge into an analog voltage signal, although other types of signals may be used. The magnitude of the voltage signal corresponds to the energy of gamma rays, and information from the output device may include an energy spectrum representative of the detected radiation. The energy spectrum may be expressed in terms of magnitude (e.g., gamma ray counts per period of time) as a function of energy.

The energy spectrum may be used to estimate parameters of interest of an earth formation. For example, the radioactive decay of radionuclides may produce nuclear radiation that may be detected by radiation detectors, as described above. Radionuclides may include naturally occurring radionuclides, such as potassium-40, and the uranium and thorium series, which exist in the earth formation, and activated radionuclides, which may include radionuclides activated from the irradiation of nuclides with nuclear radiation. Since the energy spectrum may include energy spectrum components from multiple radionuclides, the nuclear radiation information may be separated to identify the energy spectrum components contained within the energy spectrum, and thereby estimate the concentration of at least one radionuclide in the volume of interest of the earth formation.

Pulses from the PMT tend to be randomly spaced in time, and may not be evenly distributed. For a pulsed neutron-logging tool, a high flux of gamma rays is desirable to reduce the logging time. As the average time between the arrivals of gamma rays decreases, the interfacing effects between adjacent pulses make pulse detection more difficult. These effects are generally known as "pile-up," which leads to distortions in the recorded spectrum and the first-detected pulse, and, thus, in the subsequent spectroscopic analysis. Pile-up phenomena can be classified into two general types, which have somewhat different effects on pulse height measurements. The first type is known as tail pile-up and involves the superposition of pulses on the long-duration tail from a preceding pulse. One remedy for tail pile-up is to eliminate the residual tails. A second type of pile-up, generally called peak pile-up, occurs when two or more pulses are sufficiently close together so that they are treated as a single pulse by the analysis system.

Many analog pulse shaping approaches have attempted to address the gamma interference, but these approaches suffer from temperature-related performance degradation and lack flexibility. In downhole environments, the ambient temperature is often greater than 150 degrees Celsius. At these nominal temperatures, behavior of the crystal, PMT, and analog electronic systems diverges from room temperature parameters.

High-Flux Configurable Digital Spectrometer

Aspects of the present disclosure may include a multi-channel digital spectrometer with increased reliability and functionality. General apparatus embodiments may include at least one radiation detector configured to generate an analog electrical signal responsive to a plurality of radiation events, wherein each radiation event of the plurality of radiation events comprises an absorption of incident ionizing radiation at a corresponding energy level; and an ionizing radiation spectrometer configured to convert each analog electrical signal from the at least one radiation detector into a plurality of digital signal pulses corresponding to the radiation events and resolve the plurality of digital signal pulses into radiation count information representative of the radiation events and the corresponding energy levels. In aspects multiple radiation detectors may be employed. The analog electrical signal of each radiation detector may comprise a current signal, and the analog input signal may be a voltage signal. The radiation count information may comprise a gamma ray response spectrum.

The ionizing radiation spectrometer may include an input channel for each detector comprising: a receiver circuit configured to produce an analog input signal from the analog electrical signal for each detector; and an analog-to-digital converter (ADC) configured to convert the analog input signal for each detector into the plurality of digital signal pulses. The ionizing radiation spectrometer may include at least one processor configured to determine at least one signal characteristic of at least one pulse of the plurality of digital signal pulses; use the at least one signal characteristic to create an association of the at least one pulse with an event in a particular energy window of a plurality of energy windows; and using the association to generate the radiation count information. Each energy window of the plurality of energy windows is associated with a corresponding range of energy values. The at least one processor may include a corresponding digital processing unit for the input channel corresponding to each detector.

As mentioned above, a gamma ray spectrum may be used for estimating the concentration of at least one radionuclide in the volume of interest of the earth formation. Gamma ray counts and other radiation counts may also be used for estimating further parameters of interest of the volume of interest of the earth formation. A description for some embodiments estimating these parameters of interest follows below. The estimation may be performed in multiple stages, such that an earlier stage may process the information for a later stage. One of the stages may include a technique of elemental standards-based spectral decomposition (also known as a yields method), described in further detail below.

In some implementations, the detected radiation includes gamma rays and the pulses represent a gamma ray spectrum. The gamma ray spectrum (or other applicable response spectrum) refers to not only the spectrum as originally acquired, but also after filtering, corrections, or pre-processing is applied.

Also disclosed are borehole investigation methods, systems, and apparatus for estimating formation properties using nuclear radiation, particularly an apparatus and method for estimating parameters of a formation. The method may include using gamma ray count rate information or neutron count information from a detector to estimate various parameters of interest. General apparatus and system embodiments may include a processor and storage subsystem with a program that, when executed, implements the method.

FIG. 1A schematically illustrates a system 100 having a downhole tool 10 configured to acquire information in a borehole 50 intersecting a volume of interest of an earth formation 80 for estimating density, oil saturation, and/or other parameters of interest of the formation 80. The parameters of interest may include information relating to a geological parameter, a geophysical parameter, a petrophysical parameter, and/or a lithological parameter. Thus, the tool 10 may include a sensor array 30 including sensors for detecting physical phenomena indicative of the parameter of interest x may include sensors for estimating formation resistivity, dielectric constant, the presence or absence of hydrocarbons, acoustic density, bed boundary, formation density, nuclear density and certain rock characteristics, permeability, capillary pressure, and relative permeability.

The sensor array 30 may include sensors 20, 25 for detecting radiation (e.g., radiation detectors). Detectors 20, 25 may detect radiation from the borehole, the tool, or the formation. In one illustrative embodiment, the tool 10 may also contain a radiation source 40.

The system 100 may include a conventional derrick 60 and a conveyance device (or carrier) 15, which may be rigid or non-rigid, and may be configured to convey the downhole tool 10 into wellbore 50 in proximity to formation 80. The carrier 15 may be a drill string, coiled tubing, a slickline, an e-line, a wireline, etc. Downhole tool 10 may be coupled or combined with additional tools. Thus, depending on the configuration, the tool 10 may be used during drilling and/or after the borehole (wellbore) 50 has been formed. While a land system is shown, the teachings of the present disclosure may also be utilized in offshore or subsea applications. The carrier 15 may include embedded conductors for power and/or data for providing signal and/or power communication between the surface and downhole equipment. The carrier 15 may include a bottom hole assembly, which may include a drilling motor for rotating a drill bit.

In embodiments, the radiation source 40 emits radiation (e.g., gamma rays or neutrons) into the formation to be surveyed. In one embodiment, the downhole tool 10 may use a pulsed neutron generator emitting 14.2 MeV fast neutrons as its radiation source 40. The use of 14.2 MeV neutrons from a pulsed neutron source is illustrative and exemplary only, as different energy levels of neutrons may be used. In some embodiments, the radiation source 40 may be continuous. In some embodiments, the radiation source 40 may be controllable in that the radiation source may be turned "on" and "off" while in the wellbore, as opposed to a radiation source that is "on" continuously. The measurements performed using this type of radiation may be referred to as "sourceless" measurements since they employ a source that may be turned off, as opposed to a continuously emitting chemical radiation source.

The detectors 20, 30 provide signals that may be used to estimate the radiation counts (e.g., gamma ray counts or neutron counts) returning from the formation. Generally, detectors 20, 30 are spaced in a substantially linear fashion relative to the radiation source. If two detectors are used, there may be a short spaced (SS) detector and a long spaced (LS) detector, wherein the detectors have different distances from the radiation source. For instance, in one embodiment, detector 30 may be a short spaced detector, and detector 20 may be a long spaced detector. The SS and LS detectors are not limited to being placed on the same side of the radiation source and their spacing from the radiation source may be equal or unequal. Additional detectors may be used to provide additional radiation information. Two or more of the detectors may be gamma ray detectors. Some embodiments may include radiation shielding (not shown), which may be located between radiation source 40 and the detectors 20, 30. Radiation shielding may include, but is not limited to, gamma-ray shielding and neutron shielding. Drilling fluid 90 may be present between the formation 80 and the downhole tool 10, such that emissions from radiation source 40 may pass through drilling fluid 90 to reach formation 80 and radiation induced in the formation 80 may pass through drilling fluid 90 to reach the detectors 20, 30. In other embodiments, naturally occurring radiation may pass through drilling fluid 90 to reach the detectors 20, 30.

Certain embodiments of the present disclosure may be implemented with a hardware environment that includes an information processor 11, an information storage medium 13, an input device 17, processor memory 19, and may include peripheral information storage medium 9. The hardware environment may be in the well, at the rig, or at a remote location. Moreover, the several components of the hardware environment may be distributed among those locations. The input device 17 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 11 to execute the disclosed method. Information storage medium 13 may also store the formation information provided by the user, or the formation information may be stored in a peripheral information storage medium 9, which may be any standard computer information storage device, such as a USB drive, memory stick, hard disk, removable RAM, or other commonly used memory storage system known to one of ordinary skill in the art including Internet based storage. Information processor 11 may be any form of computer or mathematical processing hardware, including Internet based hardware. When the program is loaded from information storage medium 13 into processor memory 19 (e.g. computer RAM), the program, when executed, causes information processor 11 to retrieve detector information from either information storage medium 13 or peripheral information storage medium 9 and process the information to estimate a parameter of interest. Information processor 11 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the detectors (described in further detail below with respect to FIG. 2) may be configured to record radiation counts from at least two axially spaced detectors 20, 30 and generate a time-dependent ratio between axially spaced detectors by using information from multiple bursts. This detection may be substantially continuous, which may be defined as occurring within very narrow time bins or windows (less than 1000 microseconds, or less than 10 microseconds). This ratio may be expressed as a curve or other graphical function that describes a combination of multiple ratio values. In some embodiments, the parameter of interest may be estimated using a difference between the detector counts. Herein, the term time-dependent broadly describes the property of the ratio to vary with time, as opposed to a ratio that remains constant, such as may occur with a continuous radiation source. Various properties of the formation may be determined using the time-dependent ratio curve, including, but not limited to, porosities of the formation.

In other embodiments, such electronics may be located elsewhere (e.g., at the surface, or remotely). To perform the treatments during a single trip, the tool may use a high bandwidth transmission to transmit the information acquired by detectors 20, 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time."

Figure 1B:
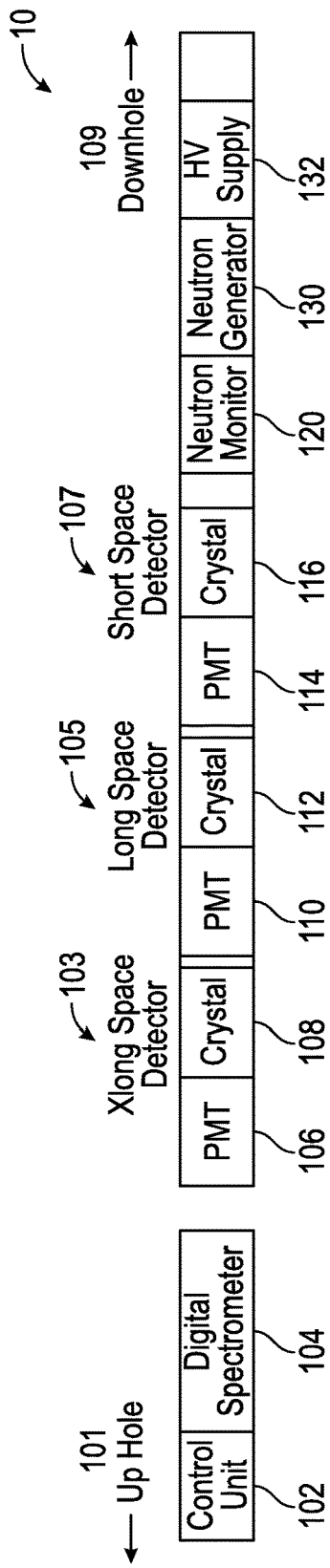
FIG. 1B illustrates an example tool in accordance with embodiments of the present disclosure.

FIG. 1B illustrates an example tool in accordance with embodiments of the present disclosure in greater detail. Tool 10 may include a neutron generator 130 fed by a high voltage supply 132, a plurality of radiation detectors 103, 105, 107 comprising scintillation media (e.g., scintillator crystals) 108, 112, 116 optically coupled with a light responsive devices (e.g., photomultiplier tubes ('PMTs') 106, 110, 114.

Figure 1C:
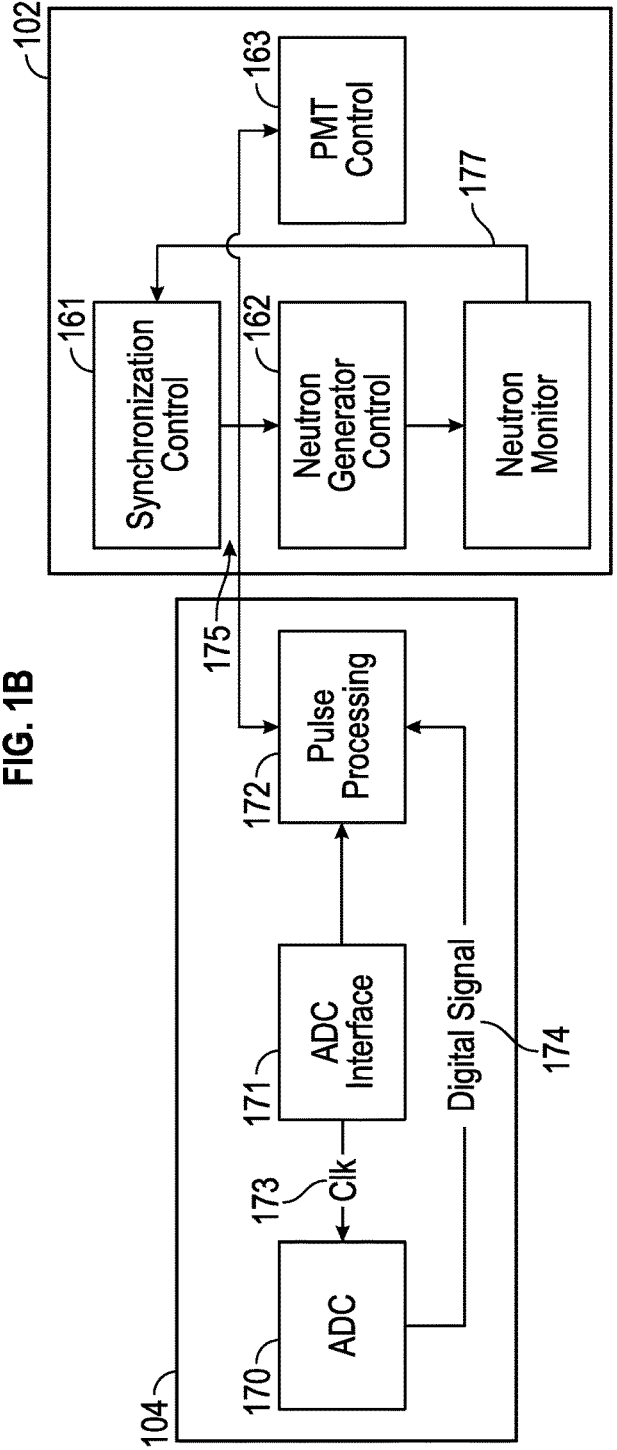
FIG. 1C illustrates an example control architecture in accordance with embodiments of the present disclosure.

FIG. 1C illustrates an example control architecture in accordance with embodiments of the present disclosure. Neutron monitor 120 is an additional neutron detector configured to monitor output from the neutron generator 130. Control unit 102 may also include neutron generator control module 162 to control the operation sequence of the neutron generator 130 and to adjust voltage supplies of the neutron generator 130, synchronization control module 161 to synchronize the neutron generator 130 and the pulse processing logic units in the digital spectrometer 104, and PMT control module 163 to adjust voltage supplies to components of the radiation detectors 103, 105, 107, such as PMTs 106, 110, 114.

The multiple radiation detectors 103, 105, 107 (e.g., gamma-ray detectors) may be spatially distributed along the tool body and synchronized with the neutron generator through a sync signal 175 from the synchronization control module 161. The sync signal may also be used by the digital spectrometer 104. The tool may also include a control unit 102 for operating the pulsed neutron generator and detectors using feedback 177 from neutron monitor 120. The neutron yield may be monitored and recorded as the radiation is measured. The results can be the distribution of counts with time or the energy distribution. There may be a programmable delay between the pulse acquisition and the neutron source firing, with the number of source fire sequences recorded with the delivery spectra. In some implementations, the monitor system can discriminate neutrons from gamma rays at the same detector used for gamma ray detection.

An Analog-to-Digital Converter (ADC) 170 of the digital spectrometer 104 provides a digital signal 174 to pulse processing 172 via an ADC interface 171. ADC 170 operates using the clock signal 173 from the ADC interface 171.

The neutron generator and pulse processing are synchronized to perform various operation modes. The switching frequency and the duty cycles of the neutron pulse may be programmable. The timestamp will reset to the beginning after a sequence of neutron fires. In the last stage of a sequence, the neutron generator may be idle, while pulse processing continues to measure background gamma rays.

System calibration may be regularly conducted when the neutron generator has been idle for more than 1 millisecond (ms). During the calibration, pulses without filtering are first normalized by the amplitude, averaged, and then fitted by a function to derive the pulse template. The desirable output template for pulse shaping is described by a window function. The filter is then configured as an optimal filter through FFT and IFFT.

The scintillation crystals 108, 112, 116 produce light scintillations responsive to incident radiation. The light from each crystal interacts with its respective PMT, which produces an analog electrical (e.g., current) signal. To deliver a high counting system, crystals with fast decay time constants, such as, for example, Prelude420™ (LYSO) and BriLance380™ (LaBr3) (having a primary decay time of 41 ns and 16 ns, respectively) may be utilized. The output from the radiation detectors 103, 105, 107 is received by a multi-channel digital spectrometer 104. The multi-channel digital spectrometer 104 is an ionizing radiation spectrometer configured to convert each analog electrical signal from each radiation detector into a corresponding plurality of digital signal pulses (e.g., digital signal 174) associated with the radiation events, and resolve the plurality of digital signal pulses into radiation count information representative of the radiation events and the corresponding energy levels. The spectrometer 104 can perform pulse acquisition, digital filtering, pulse detection, pulse pile-up rejection, baseline adjustment, filter adjustment, and neutron source monitoring.

Figure 2:
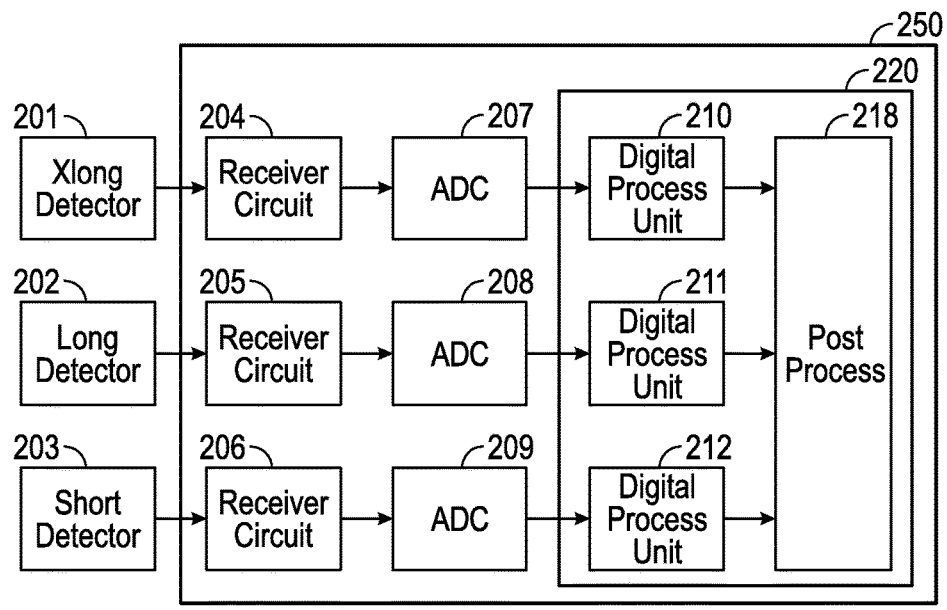
FIG. 2 is a data flow diagram illustrating an example system architecture in accordance with embodiments of the present disclosure.

FIG. 2 is a data flow diagram illustrating an example system architecture in accordance with embodiments of the present disclosure. The detectors 201-203 produce an analog electrical signal responsive to a plurality of radiation events, as described above. Each radiation event may be an absorption of incident ionizing radiation at a corresponding energy level.

This signal enters the digital ionizing radiation spectrometer via a receiver circuit 204-206 that integrates the burst charge (current) signal generated by the PMT of the detector into a voltage signal. In some implementations, the receiver circuits 204-206 may include a low-noise operational amplifier, a high-precision feedback resistor, a ceramic capacitor, and protection diodes. One function of the integration capacitor is as a scaling factor in determining the amplitude. The ceramic capacitor used as charge integration may be a COG dielectric that is temperature compensating. The protection diode may clamp the input signal of the amplifier within the ground-power range.

The pulse shape is adjustable by the feedback resistor value for a given capacitor. The feedback resistor may be a digital controller potentiometer that can adjust the resistance value as needed. The adjustable feedback resistor sets the decay time-constant of the pulse signal before the ADC, and may be configured to provide a selected range facilitating pulse detection. An optimum value of the resistor may be selected such that the signal amplitude can be accurately sampled by ADCs 207-209, described below. The resistor may be adjusted by FPGA 220 in dependence upon signal parameters. For example, for the system of FIG. 2, the resistor may be configured to produce a decay time within the range of approximately 50 ns to 200 ns.

The output of each receiver circuit 204-206 is a voltage signal with its amplitude being proportional to the total charge yielded by the respective PMT. Unlike conventional preamplifier circuitry, receiver circuits 204-206 do not use a second amplification stage to provide pulse shaping. In this way additional op-amps, susceptible to temperature influences, are avoided, and the signal may be passed directly to the ADCs 207-209.

Spectrometer 250 comprises receiver circuits 204-206, ADCs 207-209, and an integrated digital processor, herein implemented as a field-programmable gate array ('FPGA') 220. ADCs 207-209 digitalize the voltage signal produced by the receiver circuit 206. In this embodiment, each ADC may be implemented as a 125 Msps ADC with 14-bit resolution and have a parallel output interface. The sample clock for the ADCs may be driven by FPGA 220 that performs pulse processing. The FPGA 220 may be configured to compensate for voltage offset by subtracting a dynamically monitored baseline value from measurements of the digital signal pulses from the ADC reading.

The respective output signals of the receiver circuits 204-206 may be converted into differential signals as preferred by high-speed implementations of ADCs 207-209. The receiver circuits 204-206 and ADCs 207-209 may preferably be close to the PMTs 106, 110, 114 of the detectors. In one example, coaxial cable connects the receiver circuits 204-206 and the PMTs. Unlike conventional approaches, the compensating voltage offset of the receiver circuits 204-206 may be conducted digitally rather than utilizing analog circuitry to adjust the offset, which further reduces circuit complexity. A digital isolator may separate ADCs 207-209 and the FPGA 220, such that the output digital signals from the ADCs pass through the digital isolator before the FPGA 220, in order to prevent potential high-voltage hazards that may come from high-voltage power supplies of the neutron generator 130 and PMTs.

The signal emerging from each ADC 208 and entering the FPGA 220 is a digital signal, which may be operated on, in turn, by various logic modules of the FPGA 220. Each ADC thus is configured to convert the analog input signal for each detector into a plurality of digital signal pulses applied to a corresponding digital process unit 210-212. The pulse acquisition and process is switchable between a detecting period and non-detecting period. A control system also implemented in the FPGA is preferred to synchronize the neutron generator and the pulse processing. The system is unique in that substantially no signal processing occurs prior to the ADCs.

The digital process units 210-212 use a filter bank that splits the pulses into multiple subsets by an array of filters. The filter outputs are further analyzed by the FPGA. Combining the results, a pulse with the amplitude not corrupted by pile-up can be identified and assigned to a spectrum channel. Post process unit 218 may be configured to perform control functions for the other units, and analysis and handling of the radiation information.

Figure 3:
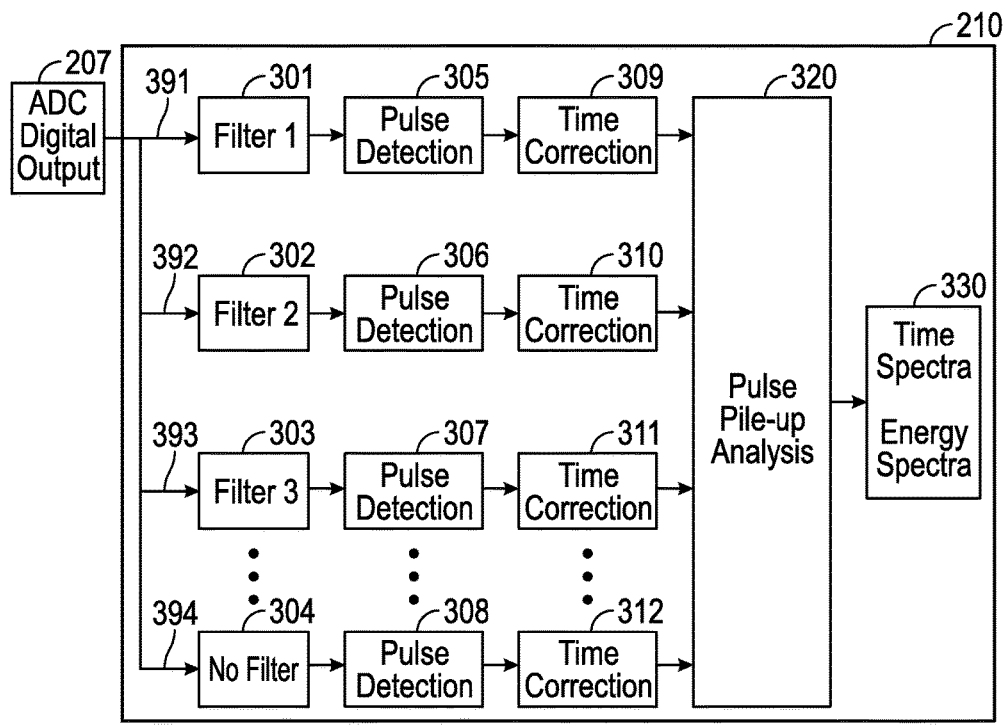
FIG. 3 shows an example digital process unit in accordance with embodiments of the present disclosure.

FIG. 3 shows an example digital process unit 210 in accordance with embodiments of the present disclosure. Digital process units 210-212 may be configured to detect the pulse signal, return the amplitude or the timestamp, or both. The pulse detection may find the amplitude and timestamp of the pulse after filtering. The pulse discrimination level is a digital number. Energy channels are collected at the ADC resolution and then mapped into a specific number of energy channels, such as, for example, 256 or 512 channels.

Pulse shaping in digital process unit 210 is conducted through n digital filters 301-303 (wherein for FIG. 3, n=3). The digital signal pulses enter digital process unit 210 from ADC 207 and are split into parallel filter channels 391-393 including the filters. The parallel filter channels 391-394 may include at least one "no-filter" channel 394 with raw digital input. Filters can also be disabled.

The filter array splits the input pulse signal into multiple components using a plurality of filters. One filter may be used in enhancing the edge, another for smoothing the amplitude, and another performing gradient detection, e.g., fitting the gradient. The arrival time of a pulse is detected from an enhanced edge starting from the baseline. The amplitude after the second filter is noise suppressed and can be accurately detected. The detection result from the third filter comprises the rising portion and the decay portion of the pulse. Combining results from the filter bank, a pulse with the amplitude not corrupted by pile-up can be identified and assigned to a spectrum channel. When the proportion of pulses with pile-up is beyond a predetermined value, the filter bank may be adjusted to make the pulse shorter. On the other side, in a low counting system, the filter can be modified to suppress noise while allowing pulses to be wider. One criterion is the proportion of pulses that cannot be assigned to a spectrum channel because of the pile-up.

In one example, the filters have different coefficients and response characterizations, and are thus configured for different functions. A finite impulse response (FIR) filter may be optimal for use with the FPGA, although an infinite impulse response (IIR) filter may also be beneficial for some applications. For example, Filter 1 may apply an edge detection to detect the pulse event. Filter 2 may have a shifted delay to Filter 1 to detect the pulse duration. Filter 3 may use a fat top in the response to detect the amplitude. Filters may also be configured in combination to resolve pulse pile-up, as described with respect to the pulse pile-up process module 330 below. Filters may be of a band-pass type that is able to remove the DC baseline.

Pulse shaping may use digital filters with programmable coefficients, which are configured for dynamic filter reconfiguration as desired. As the detector system is adversely affected by environmental temperature, the filter coefficients can be regularly (e.g., periodically) updated. Filter coefficients can be modified either by downloading from the surface or using the data stored in the downhole system. Changing filter coefficients may be used to reconfigure pulse shaping, compensate for temperature changes, and support various crystals without modifying electronic circuits. There is no intrinsic requirement for scintillation materials to be all the same composition, nor sensitive to the same type or range of photons, neutrons or other particles. Radiation detectors having solid, crystalline, fluid, semiconductors, and so on may be used. Solid state detector systems, APDs, and other non-PMT devices may also be easily employed in the systems described herein. The filters may be switched between different applications, or according to the operation mode of the device, such as for example, switching between first filter coefficients for pulse capture and second filter coefficients for calibration, or between first filter coefficients (or other configuration parameters) for spectral logging and second filter coefficients for carbon ratio determination.

The signal in each channel, after modification from the filter logic, if applicable, is output to a pulse detection module 305-308. The detection modules may detect pulses using double thresholds—that is, by detecting the rising edge and the falling edge of each pulse. Thresholds may be calculated from the pulse-free baseline. In this way the peak and valley of each pulse may be identified. The searching length may be determined by the window used in the filter design, and/or estimated from the total counts, using a smaller value in a higher counting system.

The detection may be carried out using a pulse template V and desirable pulse VF. The detection may be conducted by a double-threshold method. A single pulse detection starts with the rising portion of the pulse crossing the first threshold (up-crossing threshold) and ends with the descending portion of the pulse crossing the second threshold (down-crossing threshold). Filter parameters may be used to configure pulse detection. In one example, filter parameters could designate the high and low thresholds and a length of the search window. These filter parameters may be derived from the shaped pulse. The thresholds may be calculated from the pulse-free baseline to account for baseline noise. The first threshold is a threshold for starting a pulse search which represents the lowest energy that is significant in formation analysis. The second threshold is an indicator of finishing the pulse search.

In operation, the pulse shape features a fast rising edge and a slow falling edge. The rising edge is primarily determined by the crystal and the falling edge is dominated by the receiver circuit. The peak time may be dominated by the crystal, which minimizes the possibility of the peak pile-up. The FPGA 220 may be configured to modify detection in response to a particular scintillator connected to the channel. As shown here, each filter channel may include distinct logic components (e.g., modules) corresponding to the particular channel. Due to the differences in delay caused by the different filters, the time instance of each pulse after different filters is corrected by time correction modules 309-312.

The pulse pile-up process module 320 mitigates the effects of pile-up to provide reliable data. Pile-up rejection is done by analyzing results from multiple filters 301-304 of the filter array. For example, the pulse pile-up process module 320 may confirm that the distance between two adjacent pulse events is within a prescribed range, and that gradients of the pulses stay within a prescribed gradient range.

The spectra building module 330 may be configured to build spectra for various applications, such as for amplitudes and timestamps. The spectra are stored in internal Random Access Memories ('RAMs') of the FPGA. Amplitude and timestamp spectra may be assigned to different RAMs, which can be accessed independently. The contents of RAMs may be reset to zero after read out. To avoid dead time in updating the spectra, the FPGA 220 may employ ping pong RAMs to store the spectra. The ping pong mechanism allows one RAM to update spectra while the other RAM is being read out. Spectra may be filtered and remapped to enhance desirable features.

Thus, the FPGA 220 conducts multiple digital pulse processing and produces detection results, such as, for example, the arrival time of a pulse and the amplitude of the pulse, and discriminates pulse pile-up. The detection data may then be built into histograms that are stored to RAMs which embody radiation information. The FPGA then sends the spectra and other energy dependent radiation information to local or remote memory or to a remote subsystem 233. Although shown as a single FPGA, the logic modules may be implemented in a variety of ways.

Post process unit 218 may be configured to perform control functions for the other units, and analysis and handling of the radiation information, and in cooperation with the digital processing units 210-212 and control unit 102, implements various integrated functionality to the tool 10.

Post process unit 218 may be configured to control the ADC, and may include pulse-processing electronics that provide the sampling clock to the ADC. Both the ADC and the FPGA, therefore, may operate at the same clock speed.

Post process unit 218 may also be configured to calculate the voltage offset of the ADC and calibrate the ADC accordingly. The voltage offset may be measured when the neutron generator is idle. In this period, the count of gamma rays is low and the possibility of pulse pile-up is also low. The baseline of the voltage signal without pulses may be treated as the offset. The task of measuring the offset can be conducted in a regular time interval by disabling the pulse shape filter. When the offset is known, the FPGA can subtract it from the ADC reading to digitally correct the offset. After the subtraction, the ADC value of the voltage signal will be substantially zero when no radiation event occurs.

Post process unit 218 may also be configured to control filtering. Post process unit 218 may influence pulse shaping by enabling various digital filters and updating the filters as necessary. Filters may be designed using a pulse template and a window function. The pulse template may be created and maintained by the downhole system.

As described above, the pulse output from the receiver circuits 204-206 may be filtered to maintain the peak detection while reducing the pulse duration. For a filter employing a windowing approach, given a pulse template V and the desirable pulse VF, the objective of the windowing approach is to find a filter kernel B, such as V*B=VF, where the symbol * represents the convolution operation. By running an Inverse Fast Fourier transform ('IFFT') on both sides of FFT(V)×FFT(B)=FFT(VF), the kernel B can be given as B=IFFT (FFT(VF)/FFT(V)).

The desirable pulse VF can be selected as a window function with a short duration and little overshoot at the baseline. The candidate windows can be Blackman, Chebyshev, Hamming, or Parabolic.

FIG. 4A is a data flow diagram illustrating methods for calibration in accordance with embodiments of the present disclosure. The method may be implemented in a hardware environment as described herein, and may be carried out by at least one processor. As calibration begins, the neutron generator is stopped at 406, and the system waits for at least 1 ms (block 408), before initiating baseline monitoring at block 410.

While no pulse is present (422), the direct current ('DC') value is measured at block 424. The DC value is used to calculate a voltage offset value at block 426. The value of the voltage offset may be stored as an ADC correction value in order to correct measurements from the ADC via subtraction (block 428).

Calibration may also include generation of filter coefficients. One example procedure to generate filter coefficients, when a single full pulse is detected (block 412) may be carried out by acquiring a single pulse waveform without a filter, and normalizing the pulse by its amplitude (block 414), before averaging and fitting the normalized pulse, e.g., with an exponential function or a polynomial function (block 416). Then a window function is selected, such as, for example, Blackman, Chebyshev, Hamming, Parabolic, and so on, for use as a pulse template (block 418).

Detected count pulses (block 402) may be compared against a desired pulse shape (block 404). Using this comparison and the pulse template filter design is carried out by calculating the filter coefficients by FFT and/or IFFT, and truncating the filter coefficients (block 420).

Post process unit 218, digital process unit 210-212, or FPGA 220 may also be configured to calculate baseline noise and thresholds. The standard deviation of the baseline may be calculated when the neutron generator is idle. The standard deviation may be used to calculate the thresholds used in pulse detection. The task can be conducted in a regular time interval.

Post process unit 218 may be configured to adjust signal processing to compensate for differences in signal characteristics specific to each detector of the plurality of ionizing radiation detectors so that digital spectrometer data is normalized. In this way, scintillators of a detector, or the detector itself, may be replaceable mid-operation in the field without any modification of electronic circuits to perform different formation logging.

FIG. 4B is a data flow diagram illustrating methods for normalization in accordance with embodiments of the present disclosure. The method may be implemented in a hardware environment as described herein, and may be carried out by at least one processor. Upon coupling a new scintillator to the digital spectrometer (block 452), FPGA 220 updates configuration parameters (block 454). The configuration parameters can be downloaded from the surface through the telemetry or read from the downhole memory. Next, the feedback resistor value is adjusted (block 456), as described above. Finally, system calibration is run (block 458), as described with respect to FIG. 4A.

As described above, aspects of the present disclosure may be applied to any type of radiation detection system, or for any other pulse-based detection system downhole. One particularly useful implementation of the present disclosure relates to pulsed neutron logging. In pulsed neutron tools, neutrons (e.g., approximately 14.1 MeV fast neutrons) are generated from the pulsed neutron generator and scattered into the formation. Neutrons may interact with the formation in at least two ways: inelastic interactions and capture interactions.

Figure 5A:
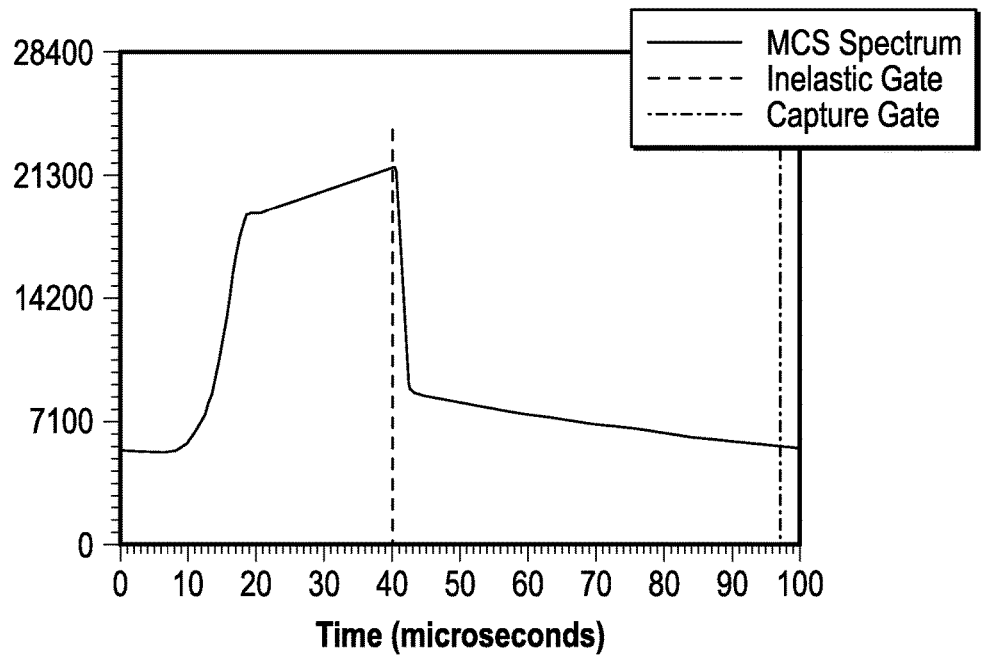
FIG. 5A illustrates a neutron source burst time cycle.

FIG. 5A illustrates a neutron source burst time cycle. The cycle includes one inelastic interaction and one capture interaction. The inelastic time cycle starts at t=0 and takes 40 microseconds while the capture time cycle starts at t=40 microseconds and ends at 90 microseconds. During the inelastic time cycle, a pulsed neutron source emits neutrons and during the capture time cycle the pulsed neutron source does not emit neutrons. Two popular spectral analysis methods in the pulsed neutron logging are spectral-ratio and full-spectrum fitting techniques. The application of the proposed method will be described for each technique.

Carbon and oxygen are of particular interest in oil well logging. Carbon and oxygen ('C/O') logging is a widely applied type of pulsed neutron logging for oil and water saturation in the formation. In the C/O mode, relative amounts of carbon & oxygen in the formation are identified to generate a C/O ratio. As is apparent, the C/O ratio would be higher in hydrocarbon bearing formations than in water bearing formations, holding other factors (e.g., porosity, lithology, etc) the same. C/O logging uses scintillation detectors to identify the gamma rays from carbon and oxygen, which are produced from a neutron inelastic scattering interaction. In practice, the most important gamma rays emitted from these elements may be at 4.44 MeV for carbon and 6.13 MeV for oxygen. The following table shows the typical inelastic gamma rays and the energy windows used for carbon and oxygen:

TABLE 1

| Nucleus | Energy (MeV) | Window (MeV) |
|---|---|---|
| Carbon | 4.44 | 3.21-4.75 |
| Oxygen | 6.13, 7.1 | 4.79-7.05 |

Figure 5B:
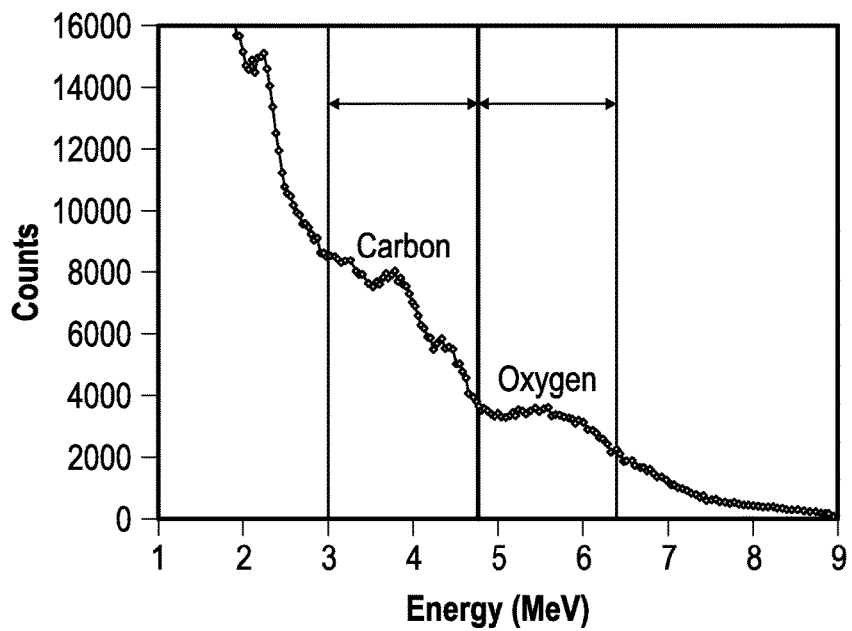
FIG. 5B illustrates an example of a carbon/oxygen spectrum.

The ratio of the gamma-ray counts in the carbon window to those in the oxygen window (C/O ratio) is proportional to the ratio of the number of carbon nuclei to the number of oxygen nuclei in the medium surrounding the tool, which, with proper interpretation, can be used to estimate the formation oil saturation and determine the amount of residual oil. An example of C/O spectrum is shown in FIG. 5B.

Figure 6A:
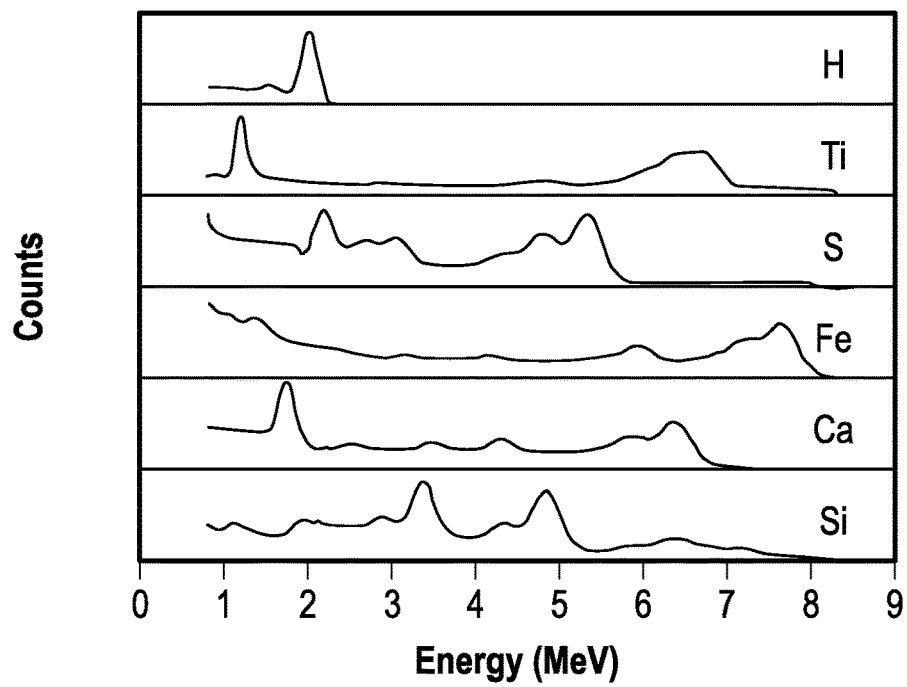
FIG. 6A and FIG. 6B illustrate capture and inelastic elemental standards.
Figure 6B:
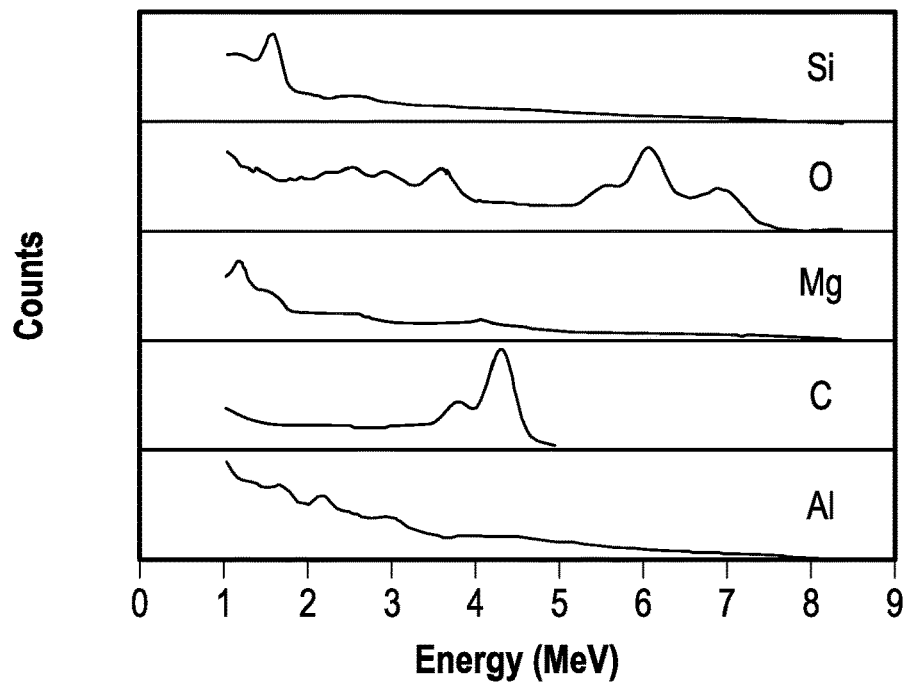

Full-spectrum fitting in pulsed neutron logging can provide lithological and quantitative mineralogical information for accurate formation evaluation. The logging system utilizes an electronically pulsed source to send high energy neutrons into the surrounding formation. These neutrons quickly lose energy as a result of scattering, after which they are absorbed by the various atoms within the ambient environment. The scattered as well as the absorbed neutrons cause the atoms of the various elements to emit gamma rays with characteristic energies, resulting in both inelastic and capture gamma ray energy spectra, as described above. The capture and inelastic elemental standards are shown in FIG. 6A and FIG. 6B.

Elemental standards-based spectral decomposition may use a combination of reference spectra, with each reference spectrum multiplied by a respective weighting coefficient. Typically a reference spectrum is included for each element of interest (e.g., an element the concentration of which is desired to be known), or for each element producing significant radiation. Each reference spectrum represents a response curve corresponding to radiation attributable to a particular sample element (e.g., uranium). Deconvolution may be linear or non-linear, and may be carried out on the response spectrum holistically without energy windows (i.e., "windowlessly"). These coefficients may be used to determine the portion of the matter of the volume constituted by the sample element. The response spectrum may be measured over a wide range of energies, resulting in improved estimation of the parameter of interest. For example, the response spectrum may span a continuous energy range including gamma ray photo peaks at characteristic energies associated with respective elements for all of the sample elements.

The standard spectra may be derived from analysis of the samples in a laboratory or on-site, or may be modeled standards—that is, standards derived using a variety of numerical, simulated, statistical, or other software-based techniques (e.g., Monte Carlo techniques), which may be obtained using a variety of methods. In one example, gamma ray measurement of a sample may provide a response spectrum to be used as the reference spectrum ('standard') for that element. Variations in patterns may be used for analysis of "shapes" and "peaks" to attribute gamma ray counts to a specific radiation responsive component (e.g., the first radiation responsive component, the second radiation responsive component, etc.).

Figure 7:
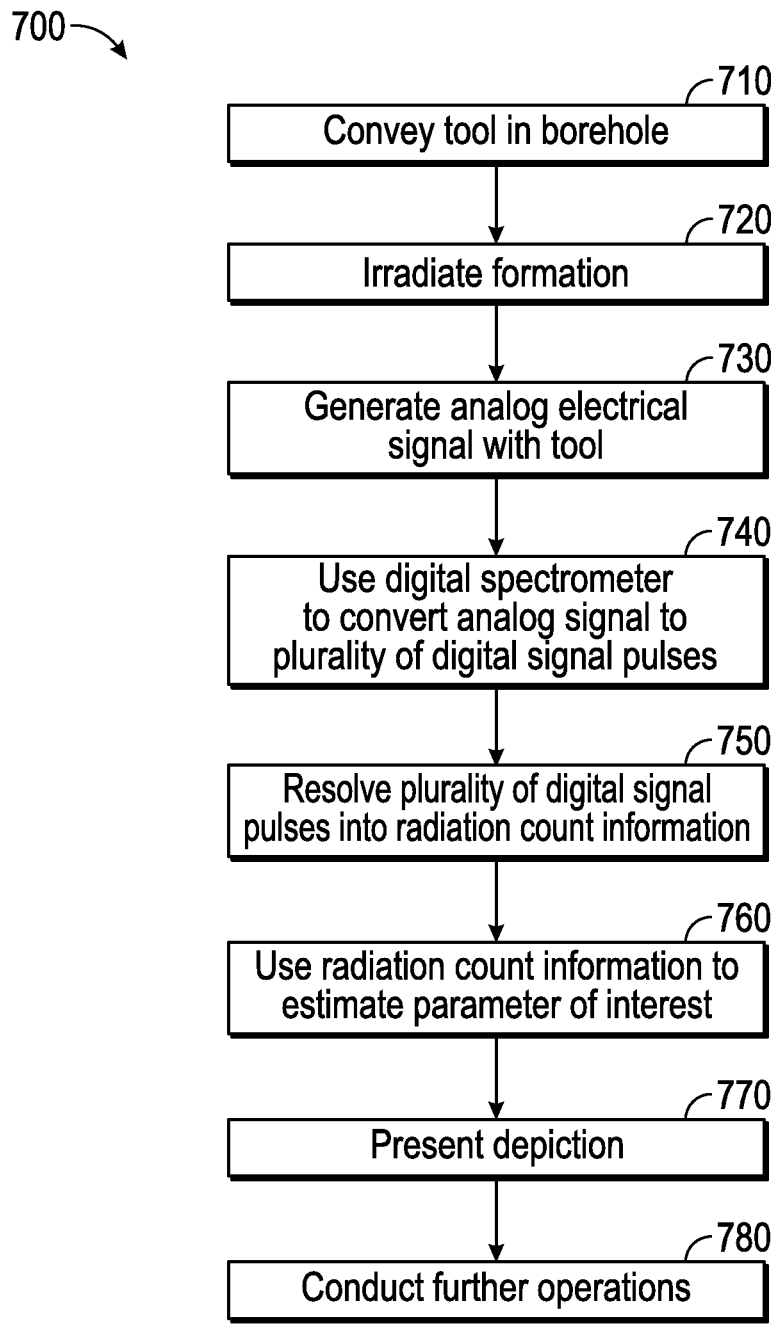
FIG. 7 shows methods in accordance with the present disclosure for evaluating an earth formation.

FIG. 7 shows, in flow chart form, one method 700 in accordance with the present disclosure for evaluating an earth formation 80 (FIG. 1). Optional step 710 may include conveying a logging tool in a borehole intersecting the formation 80. Optional step 720 may include irradiating the formation to generate radiation indicative of formation properties. Step 730 may include using at least one radiation detector on a downhole tool in a borehole intersecting the formation to generate an analog electrical signal responsive to a plurality of radiation events. Step 740 may include using an ionizing radiation spectrometer to convert each analog electrical signal from the at least one radiation detector into a plurality of digital signal pulses corresponding to the radiation events Step 750 may include using the ionizing radiation spectrometer to resolve the plurality of digital signal pulses into radiation count information representative of the radiation events. The radiation count information may be representative of the radiation events and the corresponding energy levels. The radiation count information may be indicative of a parameter of interest of the formation or the borehole.

Step 760 may include using radiation count information to estimate a value of a parameter of interest. The detected radiation may include gamma rays and the information may represent a gamma ray spectrum. Step 760 may include processing a gamma ray spectrum using at least one of: i) a windowing method; and ii) a full-spectrum deconvolution method. The gamma ray spectrum comprises at least one of: i) an inelastic gamma ray spectrum, and ii) a capture gamma ray spectrum. Step 770 may include presenting a depiction of the radiation count information, the parameter of interest, or combinations, or derivatives thereof. Step 1290 may include conducting further operations in the formation in dependence upon the results of further processing.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. Parameter of interest means property of a formation or a borehole. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. A pulse may be defined as a rapid change in some characteristic of a signal, (e.g., amplitude, phase, or frequency) from a baseline value to a higher or lower value, followed by a rapid return to the baseline value. The term subset is meant here to mean a proper (strict) subset. That is, a subset of pulses as defined herein is not identical to the plurality of pulses. In some instances, ADC devices may contain an embedded receiver circuit, which may be employed to convert charge/current signals to voltage signals, thus enabling direct connection of the detector to the ADC unit.

As used above, the term "detect" refers to interaction in the sense of converting ionizing radiation to other detectable indicia, such as, for example, photons. As used above, the term "incident" or "incident on" refers to impinging on the physical space of or penetrating the defining boundaries of. As used above, the term "traverse" means to pass through.

The present disclosure is susceptible to embodiments of different forms. While the present disclosure is discussed in the context of a hydrocarbon producing well, it should be understood that the present disclosure may be used in any borehole environment (e.g., a geothermal well). There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. An apparatus for evaluating an earth formation intersected by a borehole, the apparatus comprising:
   a plurality of radiation detectors each configured to generate an analog electrical signal comprising a current signal responsive to a plurality of radiation events, wherein each radiation event of the plurality of radiation events comprises an absorption of incident ionizing radiation at a corresponding energy level; and
   an ionizing radiation spectrometer configured to convert each analog electrical signal from the plurality of radiation detectors into a plurality of digital signal pulses corresponding to the radiation events and resolve the plurality of digital signal pulses into radiation count information representative of the radiation events, the ionizing radiation spectrometer comprising:
      an input channel for each detector of the plurality of radiation detectors comprising:
         a receiver circuit configured to produce an analog input signal for each detector from the analog electrical signal for each detector, wherein the analog input signal comprises a voltage signal; and
         an analog-to-digital converter (ADC) and configured to convert the analog input signal for each detector into the plurality of digital signal pulses; and
      at least one processor comprising a corresponding digital processing unit for the input channel for each detector, the corresponding digital processing unit comprising a parallel digital filter array configured to resolve pulse pile-up by sorting the plurality of signal pulses into at least one of a plurality of pulse subsets according to at least one signal characteristic, the at least one processor configured to:
         determine at least one signal characteristic of at least one pulse of the plurality of digital signal pulses; and
         use the at least one signal characteristic to create an association of the at least one pulse with an event in a particular energy window of a plurality of energy windows, each energy window of the plurality of energy windows associated with a corresponding range of energy values; and
         use the association to generate the radiation count information.

2. The apparatus of claim 1, wherein the radiation count information comprises a gamma ray response spectrum.

3. The apparatus of claim 1, wherein the at least one processor comprises a corresponding digital processing unit for the input channel for each detector.

4. The apparatus of claim 3, wherein the corresponding digital processing unit is configured for digital pulse shaping, pulse detection, and spectra building.

5. The apparatus of claim 1, wherein the corresponding digital processing unit comprises a pulse detection module for each filter of the parallel digital filter array.

6. The apparatus of claim 5, wherein the corresponding digital processing unit is configured to resolve pulse pile-up by combining results from the pulse detection module for each filter.

7. The apparatus of claim 1, wherein the pulse detection module for each filter conducts pulse detection using a plurality of thresholds estimated from baseline noise.

8. The apparatus of claim 1, wherein the pulse detection module for each filter conducts pulse detection using a search window estimated from delivered pulse counts.

9. The apparatus of claim 1, wherein for the input channel for each detector of the plurality of radiation detectors, the receiver circuit comprises an adjustable feedback resistor configured to integrate a charge of the current signal to produce the analog input signal.

10. The apparatus of claim 1, wherein the at least one processor is configured to compensate for voltage offset by subtracting a monitored baseline value from measurements of the digital signal pulses.

11. The apparatus of claim 1, wherein the at least one processor is configured to:
   conduct pulse shaping of a first portion of the digital signal pulses using a digital filter employing first values of filter coefficients stored in a computer memory accessible to the at least one processor;
   update the filter coefficients in dependence upon the digital pulses by storing second values of the filter coefficients in the computer memory; and
   conduct pulse shaping of a second portion of the digital signal pulses using the digital filter employing the second values of the filter coefficients stored in the computer memory;
   wherein the digital filter comprises at least one of: i) a finite impulse response (FIR) filter; and ii) an infinite impulse response (IIR) filter.

12. The apparatus of claim 1, further comprising a pulsed neutron generator.

13. The apparatus of claim 12, wherein the at least one processor is configured to stabilize peaks in a response spectrum derived from the radiation count information by adjusting power to at least one of: i) the pulsed neutron generator; and ii) at least one radiation detector of the plurality of radiation detectors.

14. The apparatus of claim 12, wherein the at least one processor comprises a corresponding digital processing unit for the input channel for each detector, and wherein the at least one processor is configured to synchronize the pulsed neutron generator with the corresponding digital processing unit for the input channel for each detector.

15. The apparatus of claim 1 wherein the at least one processor comprises a single integrated circuit.

16. The apparatus of claim 1 wherein the ionizing radiation spectrometer is configured to accept analog electrical signals from the plurality of radiation detectors, the plurality of radiation detectors each having different components and adjust signal processing to compensate for differences in signal characteristics specific to each detector of the plurality of radiation detectors.

17. The apparatus of claim 1, wherein the radiation count information comprises at least one of: i) energy-dependent radiation count information, and ii) time-dependent radiation count information.

18. The apparatus of claim 1 comprising at least one computer memory accessible to the at least one processor for storing configuration parameters used by the at least one processor to configure the spectrometer for use with particular radiation detectors.

19. The apparatus of claim 1, wherein each of the plurality of radiation detectors comprises:
at least one scintillator configured to produce light scintillations responsive to the radiation events and optically coupled to at least one photomultiplier tube configured to produce the current signal responsive to the light scintillations.

20. The apparatus of claim 1 wherein for the input channel for each detector, the receiver circuit is configured to integrate a charge of the analog electrical signal to produce the analog input signal.

21. An apparatus for evaluating an earth formation intersected by a borehole, the apparatus comprising:
at least one radiation detector configured to generate an analog electrical signal responsive to a plurality of radiation events, wherein each radiation event of the plurality of radiation events comprises an absorption of incident ionizing radiation at a corresponding energy level; and
an ionizing radiation spectrometer configured to convert each analog electrical signal from the at least one radiation detector into a plurality of digital signal pulses corresponding to the radiation events and resolve the plurality of digital signal pulses into radiation count information representative of the radiation events;
an input channel for each detector of the at least one radiation detector comprising an analog-to-digital converter (ADC) and configured to convert the analog electrical signal for each detector into the plurality of digital signal pulses; and
at least one processor configured to:
determine at least one signal characteristic of at least one pulse of the plurality of digital signal pulses; and
use the at least one signal characteristic to create an association of the at least one pulse with an event in a particular energy window of a plurality of energy windows, each energy window of the plurality of energy windows associated with a corresponding range of energy values; and
use the association to generate the radiation count information;
wherein the at least one processor comprises a corresponding digital processing unit for the input channel for each detector, the corresponding digital processing unit comprising a parallel digital filter array configured to resolve pulse pile-up by sorting the plurality of signal pulses into at least one of a plurality of pulse subsets according to at least one signal characteristic.

22. An apparatus for evaluating an earth formation intersected by a borehole, the apparatus comprising:
at least one radiation detector configured to generate an analog electrical signal responsive to a plurality of radiation events, wherein each radiation event of the plurality of radiation events comprises an absorption of incident ionizing radiation at a corresponding energy level; and
an ionizing radiation spectrometer configured to convert each analog electrical signal from the at least one radiation detector into a plurality of digital signal pulses corresponding to the radiation events and resolve the plurality of digital signal pulses into radiation count information representative of the radiation events;
an input channel for each detector of the at least one radiation detector comprising an analog-to-digital converter (ADC) and configured to convert the analog electrical signal for each detector into the plurality of digital signal pulses; and
at least one processor configured to:
determine at least one signal characteristic of at least one pulse of the plurality of digital signal pulses; and
use the at least one signal characteristic to create an association of the at least one pulse with an event in a particular energy window of a plurality of energy windows, each energy window of the plurality of energy windows associated with a corresponding range of energy values;
use the association to generate the radiation count information;
conduct pulse shaping of a first portion of the digital signal pulses using a digital filter employing first values of filter coefficients stored in a computer memory accessible to the at least one processor;
update the filter coefficients in dependence upon the digital pulses by storing second values of the filter coefficients in the computer memory; and
conduct pulse shaping of a second portion of the digital signal pulses using the digital filter employing the second values of the filter coefficients stored in the computer memory;
wherein the digital filter comprises at least one of: i) a finite impulse response (FIR) filter; and ii) an infinite impulse response (IIR) filter.

* * * * *